(No Model.)
A. L. PLIMPTON & E. HARRINGTON.
STATIONARY SWITCH FOR HORSE RAILWAYS.
No. 408,744. Patented Aug. 13, 1889.
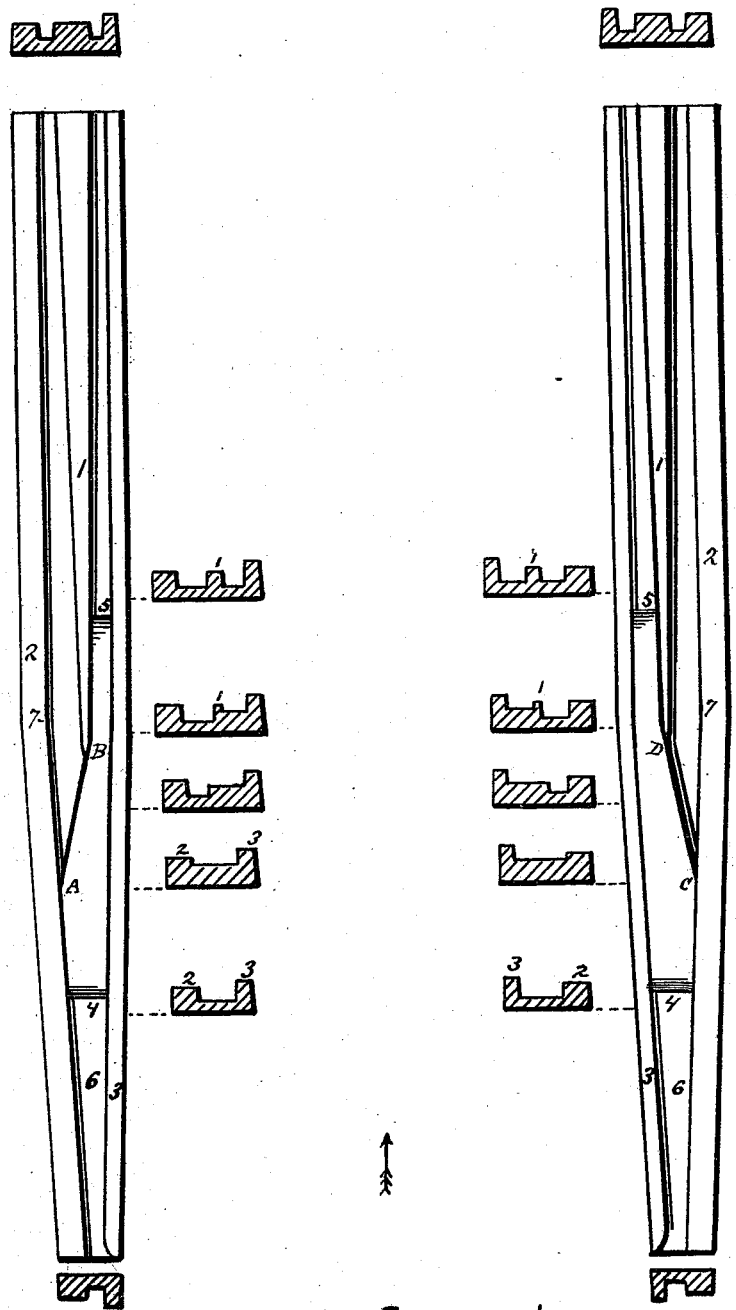
Attest:
Caleb H. Swan
Frank Snyder.
Inventors:
Arthur L. Plimpton
& Ephriam Harrington.
by Knight Bros.
Attys.

UNITED STATES PATENT OFFICE.

ARTHUR L. PLIMPTON AND EPHRAIM HARRINGTON, OF BOSTON, MASSACHUSETTS.

STATIONARY SWITCH FOR HORSE-RAILWAYS.

SPECIFICATION forming part of Letters Patent No. 408,744, dated August 13, 1889.

Application filed December 6, 1888. Serial No. 292,804. (No model.)

*To all whom it may concern:*

Be it known that we, ARTHUR L. PLIMPTON and EPHRAIM HARRINGTON, of Boston, Suffolk county, Massachusetts, have invented certain new and useful Improvements in Stationary Switches for Horse-Railways, of which the following is a specification.

The object of our invention is to provide a substitute for the hinged tongue-switch that is ordinarily used.

Our invention relates to that class of switches in which both the switch-point and its mate are provided with fixed tongues, one of said tongues having a left-hand offset or "drop" adjusted to it, while the other tongue has a similar adjacent right-hand offset or drop, these offsets being so arranged that either the right-hand wheel or the left-hand will drop, according to whether the horses pull straight ahead or off to one side. The dropping of a front wheel off one of the offsets insures the safe guiding of the car in that direction without further pulling sidewise.

Our invention consists of features of novelty hereinafter explained in connection with the accompanying drawing, and particularly pointed out in the claims.

In the said drawing our improved switch-point is shown in plan and in section, the sectional views being shown opposite the points where they are supposed to be taken.

The stationary switch-tongues are shown at 1, the "tread" upon which the car-wheels run is shown at 2, and the "guards" at 3. From the point 4 to the point 5 we form a slightly-raised part in the groove 6, upon which the flange of the wheel rides, and this raised part ends along the lines A B and C D, so as to form a drop or offset extending diagonally outward from the point of the tongue to the outside rail. The purpose of this diagonal edge is to leave between the points A C a plain flat surface for the flanges of the wheels to run on of greater gage than the gage of the tread or track-rails 2, so that when the wheels mount the raised portion in the groove 6 the flange of one or the other of the wheels will not immediately drop off the offset, (as would be the case if, instead of the diagonal edge A B or C D, such edge were extended straight with the edge of the tongue and then cut at right angles to the tread 2,) but the flanges after they have passed the points A C will still have considerable plain surface on each side, which affords greater opportunity for the wheels to be sheered in the proper direction without danger of dropping off the wrong offset.

Now, supposing a car to be entering the switch in the direction of the arrow, it will be seen that if the horses pull straight ahead the left-hand wheel will drop off the offset A B before the points of the tongues are reached, after which it will be impossible for the car to take the switch-point wrong.

If it is desired to switch off from the main track, the horses are turned to the right or left, as the case may be, and the forward wheel drops off the offset C D. The horses are then turned to haul straight, and the lead given to the forward wheels will cause the rear wheels to follow in the same track.

In order to throw the rear wheels well against the tread, we introduce a slight bend in the tread-line at 7 just beyond the point of the switch, the effect of which will be to cause the rear wheels to more surely follow the track of the first pair.

The length of the switch must be sufficient to allow the rear wheels to drop off the offset C D before the forward wheels take the curve. This removes the tendency of the rear wheel to shoot by the tongue into the wrong track.

Having thus described our invention, what we claim as new is—

1. In a horse-railway switch, the combination of the outside rail 2 with the stationary tongue 1 and the filling-in part 4 5, the latter having a dropping-off edge A B, extending diagonally from the point of the tongue to the outside rail.

2. The combination of the rail 2, tongue 1, guard 3, and filling-in part 4 5, having the diagonal drop edge A B, substantially as and for the purpose set forth.

ARTHUR L. PLIMPTON.
EPHRAIM HARRINGTON.

Witnesses:
HENRY S. SWAIN,
FRANK L. TIBBETTS.